United States Patent [19]

Porter et al.

[11] 4,413,250

[45] Nov. 1, 1983

[54] DIGITAL COMMUNICATION SYSTEM FOR REMOTE INSTRUMENTS

[75] Inventors: Ronald G. Porter, Anaheim; Richard E. LeBlanc, Orange; Rolf W. Siemon, Brea, all of Calif.

[73] Assignee: Beckman Instruments, Inc., Fullerton, Calif.

[21] Appl. No.: 298,870

[22] Filed: Sep. 3, 1981

[51] Int. Cl.[3] ........................ G08C 19/02; H04B 3/60; H04Q 9/00

[52] U.S. Cl. ........................... 340/310 A; 340/870.39; 340/870.02; 340/825.54; 340/825.63

[58] Field of Search .......... 340/310 R, 310 A, 825.63, 340/870.39, 870.2, 870.01, 870.02, 825.54

[56] References Cited

U.S. PATENT DOCUMENTS

| | | | |
|---|---|---|---|
| 3,659,277 | 4/1972 | Brown | 340/870.2 |
| 3,742,473 | 6/1973 | Hadden | 340/870.39 |
| 3,922,490 | 11/1975 | Pettis | 340/870.02 |
| 4,272,758 | 6/1981 | Giraud | 340/310 R |
| 4,292,633 | 9/1981 | Goodwin, Jr. et al. | 340/310 R |
| 4,311,986 | 1/1982 | Yee | 340/825.54 |

*Primary Examiner*—Donald J. Yusko
*Attorney, Agent, or Firm*—R. J. Steinmeyer; P. R. Harder; E. C. Jason

[57] ABSTRACT

A communication system for communicating digitally encoded information from a remote transmitting station to a central receiving station. The central station supplies d-c operating power to a remote station through a d-c power distribution line. A voltage regulator at the remote station receives the d-c operating power and derives therefrom a constant d-c voltage for powering the circuitry of the remote station. A digital transmitter at the remote station changes the magnitude of the current drawn through the voltage regulator, in accordance with a message to be transmitted, and thereby changes the current in the power distribution line without affecting the voltage supplied to the circuitry of the remote station. These line current changes are detected and decoded at the central station to reconstruct the transmitted message.

18 Claims, 5 Drawing Figures

DIGITAL COMMUNICATION SYSTEM FOR REMOTE INSTRUMENTS

BACKGROUND OF THE INVENTION

The present invention relates to communication systems and is directed more particularly to communication systems in which messages are transmitted from a remote station to a central station over a power distribution line through which the central station supplies operating power to the remote station.

In operating a process having a plurality of processing stations that are located at differing distances from a central control facility, it is important that the central station have current information as to the operational status of each remote station. In a chemical processing plant, for example, it is often of vital interest for a central control facility to have current information as to the temperature, pH or pressure in each of a number of remotely located chemical processing tanks. In such systems one widely used method of communicating the needed information involves the transmission of data over one or more conductor pairs that are connected between each remote station and the central station to serve as data transmission paths. While such conductor pairs work adequately from an information transmission standpoint, their cost can be extremely high, particularly where the remote stations may be hundreds or even thousands of feet from the central station.

In those communication systems in which there already exist conductor pairs that connect the central station to the remote stations, e.g. power distribution lines through which the central station supplies a-c operating power to the remote stations, there have been developed communication systems which transmit the desired information by modulating the amplitude, frequency or phase of carrier signals that are introduced into the power distribution line. In a typical communication system of this type the desired operating power is transmitted by a-c voltages and currents having a low frequency, such as 60 Hz, while the desired information is transmitted by a-c voltages and currents having very much greater frequencies, such as ten kilohertz. While such communication systems operate satisfactorily, the costs thereof can be extremely high. One reason is that in such systems there is required, in addition to the circuitry that produces and encodes the information to be transmitted, at least one carrier frequency oscillator, a modulating circuit, and a demodulating circuit. In addition, if multiplexing techniques are used to provide a plurality of data channels, there must be provided additional oscillators, modulators and demodulators as well as a number of high-pass, low-pass, and/or band pass filters for channel separation. Where the number of remote stations and the number of channels are relatively large, the cost of such communication systems exceeds even that of providing a separate pair of conductors for each desired data channel.

SUMMARY OF THE INVENTION

In accordance with the present invention there is provided an improved digital communication system which transmits the desired information, but which does not require either the laying of additional conductor pairs or the provision of carrier circuitry.

In accordance with one feature of the present invention, d-c operating voltage and current are supplied from a central station to a remote station through a power distribution line having a voltage regulator at each end thereof. The voltage regulator at the remote station assures that a substantially constant d-c operating voltage is supplied to the circuitry at that station in spite of changes in the magnitude of the current drawn through the voltage regulator. This allows a data transmitting switch that is connected across the remote station side of the voltage regulator to increase or decrease the current drawn therethrough, in accordance with a signal to be transmitted, without adversely affecting the operation of the station circuitry. Since, however, this increased or decreased current causes the voltage regulator to draw an increased or decreased current through the power distribution line, the switching of the data transmitting switch causes information conveying current changes to occur at all points along the power distribution line. These current changes are detected at the central station by comparing the actual current drawn from the central station with the current that is known to be drawn from the central station when no information is being transmitted by the remote station. During this comparison the voltage regulator at the central station assures that the current in the power distribution line is unaffected by changes in the voltage of the commercial a-c line from which the central station derives its own operating power.

One important advantage of the communication system of the invention is that it uses a conductor pair which is already present for power distribution purposes. In addition, the communication system of the invention requires little circuitry in addition to the signal processing circuitry (e.g. A/D converters) that must be present in the transmitting and receiving stations without regard to type of communication link therebetween. In other words, the actual transmitting and receiving portion of the communication system of the invention uses only a small number of inexpensive, readily available components at each end of the power distribution line. Thus, the present invention allows communication to be established between two stations at a very low cost.

Another important advantage of the present invention is that it can operate with lines of differing lengths and resistances. If, for example, the length of the power distribution line to one remote station is twice as long as that to another remote station, the voltage drop across the voltage regulator at the more distant station will be lower than that across the voltage regulator at the less distant station. The desired operating current level will, however, be the same in both lines. This allows the communication system of the invention to use a single circuit design to accommodate a variety of different types and lengths of power distribution lines.

A still further advantage of the communication system of the invention is that it is relatively immune to the effect of the high electromagnetic noise levels that are common in industrial environments. Because the data transmitting switch in each remote station does not affect the operating voltage of the station circuitry, the current changes by which information is transmitted can be made large enough to provide a high signal-to-noise ratio for all transmitted signals. This fact, together with the fact that noise signals ordinarily involve relatively high voltages and relatively low currents, assures that data from the remote station can be received and correctly decoded at the central station substantially without concern for environmental noise levels. Thus, the communication system of the invention provides improved performance as well as reduced costs.

DESCRIPTION OF THE PREFERRED EMBODIMENTS

Figure 1A:
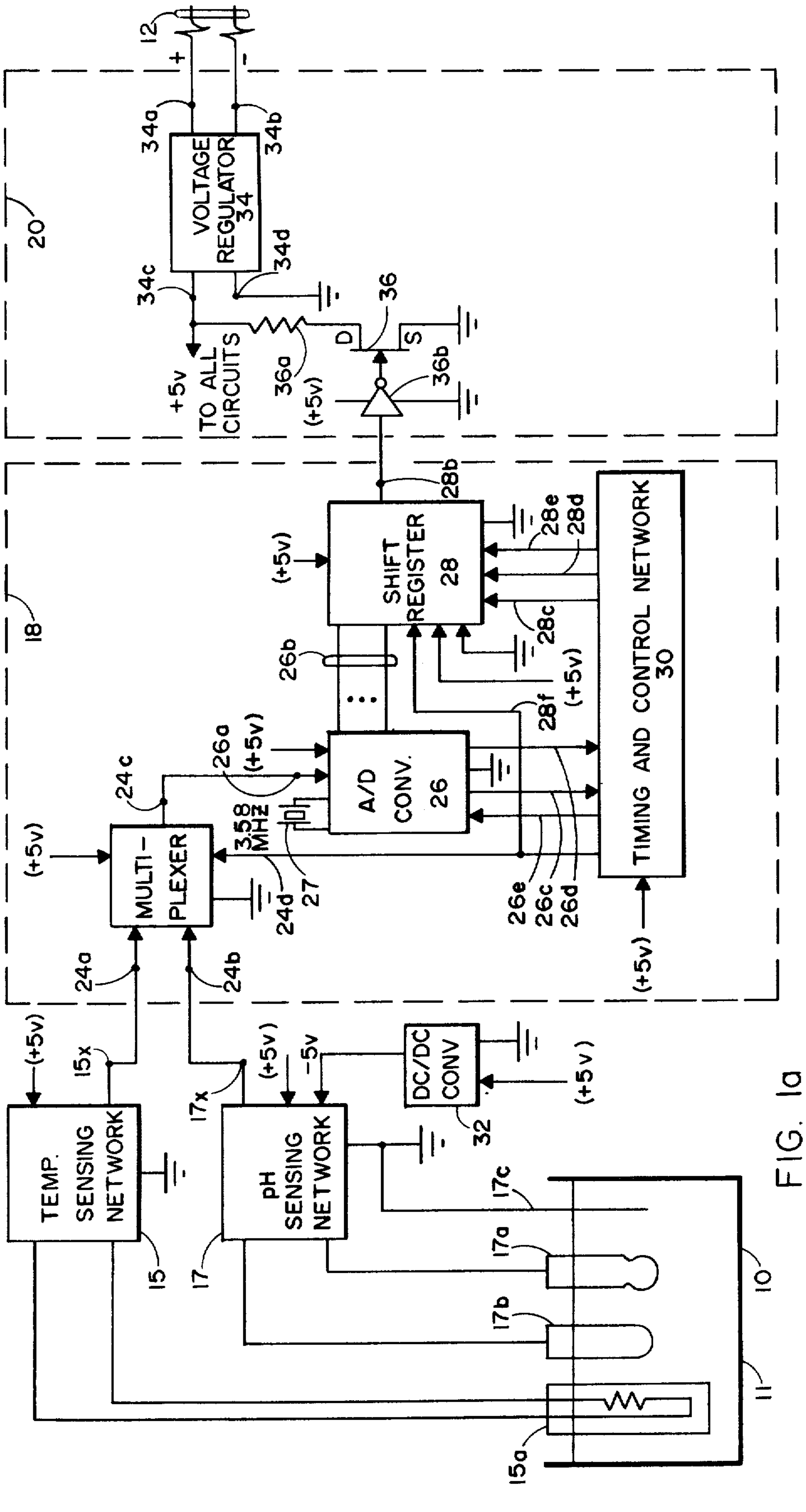
FIGS. 1*a* and 1*b* together comprise a block-schematic diagram of the preferred embodiment of the present invention.

Referring to FIG. 1*a*, there is shown a tank 10 which contains a liquid 11 about which information is required at a central control facility a considerable distance away. Tank 10 may, for example, be located at one of the numerous widely separated processing stations that together comprise a chemical manufacturing plant, and the central control station may be the control center of the plant. The desired information about liquid 11 may consist of its temperature, pressure, pH or in general any other quantity of interest. In FIG. 1*a* this information is illustrated as being gathered by an information gathering apparatus 13 which includes a temperature sensing network 15 having a temperature probe **15*a* and a pH sensing network 17 to which is connected a pH electrode 17*a*, a reference electrode 17*b* and a solution ground electrode 17*c*. Temperature sensing network 15 produces at output 15*x* thereof an analog signal indicative of the temperature of liquid 11, and pH sensing network 17 produces at output 17*x* thereof an analog signal indicative of the pH of liquid 11. Because the present invention can be understood without reference to the internal structure or operation of networks 15 and 17**, this internal structure and operation will not be described herein.

Figure 1B:
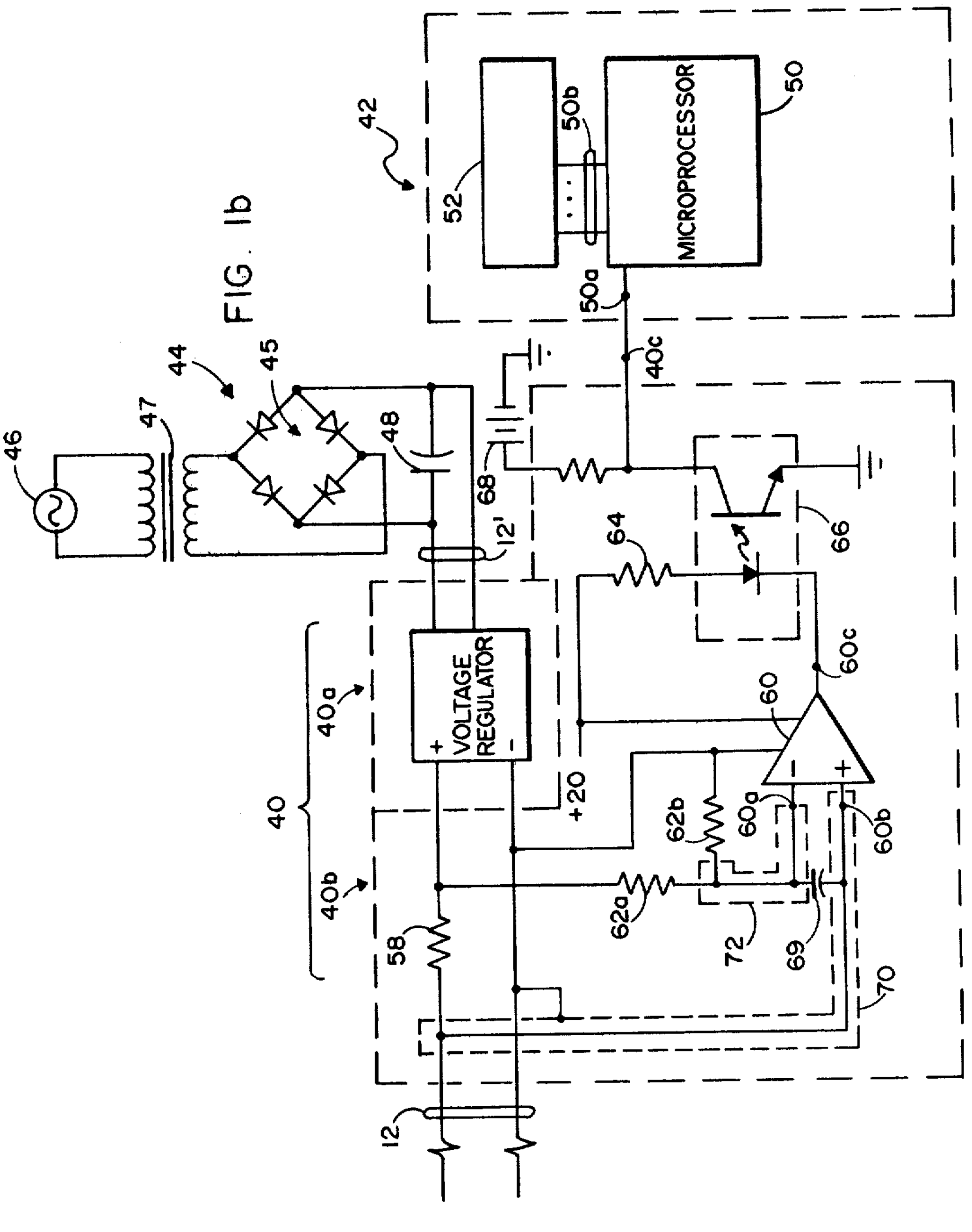

In order to avoid the cost of separate power line wiring and power supplies at each processing station, it is often the practice to supply the power necessary to operate information gathering apparatus 13 from the central station over a power distribution line comprising two or more metallic conductors. In the embodiment of FIGS. 1*a* and 1*b*, this power distribution line is illustrated as conductor pair 12 and the part of the central station that is associated with line 12 is shown in FIG. 1*b*. Thus, power distribution line 12 joins the central station illustrated in FIG. 1*b* to the remote station illustrated in FIG. 1*a*.

To the end that the analog signals at outputs **15*x* and 17*x* of sensing networks 15 and 17 may be digitized and transmitted to the central station over power distribution line 12**, the remote station of FIG. 1*a* includes a digital signal generating network 18 and a digital signal transmitting network 20. Generally speaking, data signal generating network 18 receives the analog signals from sensing networks 15 and 17 and converts them to a multiplexed, serial format digital signal suitable for application to signal transmitting network 20. Signal transmitting network 20 receives this digital signal and impresses it on power distribution line 12 in a form in which it can be transmitted to and received by a signal receiving network 40 at the central station.

In the embodiment of FIGS. 1*a* and 1*b*, digital signal generating network 18 includes a multiplexer 24, an analog-to-digital converter 26, a shift register 28 and a timing and control network 30. Multiplexer 24, which may comprise an analog switch, alternately connects one and then the other of the analog signals at inputs **24*a* and 24*b* thereof to output 24*c* thereof. The signal that appears at output 24*c* at any given time is dependent upon the state of a control signal which is applied to multiplexer 24 by timing and control network 30 over a control line 24*d*. For analog signals which change as slowly as temperature and pH, a relatively slow control signal frequency such as 1.7 Hz has been found adequate since it connects the output of each of networks 15 and 17 to multiplexer output 24*c* almost twice each second. While the function of multiplexer 24** may be performed by a variety of circuits, one particularly convenient circuit is the analog switch sold under the designation DG301 by Siliconix, Inc.

Analog-to-digital or A/D converter 26 serves to receive at input **26*a* thereof the multiplexed analog signal from multiplexer 24 and to provide at a set of output conductors collectively designated 26*b* a succession of parallel format digital signals having, for example, 12 data bits and one polarity bit. In order to assure that the operation of A/D converter 26 is coordinated with that of multiplexer 24 and shift register 28, A/D converter 26 is connected to timing and control network 30 through clock, status and control lines 26*c*, 26*d* and 26*e*, respectively. Of these, control line 26*e* provides converter 26 with a control signal that determines whether converter 26 is to initiate a new A/D conversion or to hold on output 26*b* the results of the last completed A/D conversion. In addition, status line 26*d* provides to timing and control network 30 a signal that indicates whether or not the last initiated A/D conversion has been completed. Finally, clock line 26*c* supplies to network 30 the high frequency clock signal from which all of the other output signals of network 30** may be derived or with which those signals may be strobed. One A/D converter which has been found suitable for use in the embodiment of FIG. 1*a* is sold under the designation ICL-7109 by Intersil.

Shift register 28 serves to receive the 13 bits of parallel format data from outputs **26*b* of A/D converter 26 and to output this data in serial form at output 28*b* thereof. The loading and shifting of data by shift register 28 occurs under the control of timing and control network 30, which applies control signals thereto through control lines 28*c*, 28*d* and 28*e*. If shift register 28 has a 16 bit input word length, the three bits that are not used for data may be used to "pack", into each 16 bit output word, three bits of data identifying or synchronizing information, as will be described presently in connection with FIG. 2. Among control lines 28*c*–28*e*, control line 28*c* carries the load signal by which shift register 28 is caused to load a new input word from A/D converter 26, control line 28*d* carries an enable signal by which shift register 28*d* can be made to output a continuous "O" state signal on demand, and line 28*e* carries the shift signal by which register 28 is caused to shift a new output bit to output 28*b*. One circuit configuration suitable for use as shift register 28** comprises two series-connected eight-bit shift registers of the type sold under the designation MM74C165 by National Semiconductor Corporation.

In order to coordinate the above-described switching activity of data signal generating network 18, timing and control network 30 preferably includes a suitable set of counters, gates and time delay circuits which generate the desired control signals from the clock signal supplied thereto over control line 26*c*. While this clock signal may be provided from any suitable source, one particularly convenient source is the clock signal which appears on output line 26*c* of A/D converter 26 when the latter is connected to a 3.5795 MHz crystal in the manner suggested by the manufacturer. Because the circuitry of timing and control network 30 is conventional, the structure and operation thereof will not be specifically described herein. The nature of the circuitry within network 30 will, however, be apparent to those skilled in the art from the following description of the format of the digital signals produced by network 18.

Figure 2:
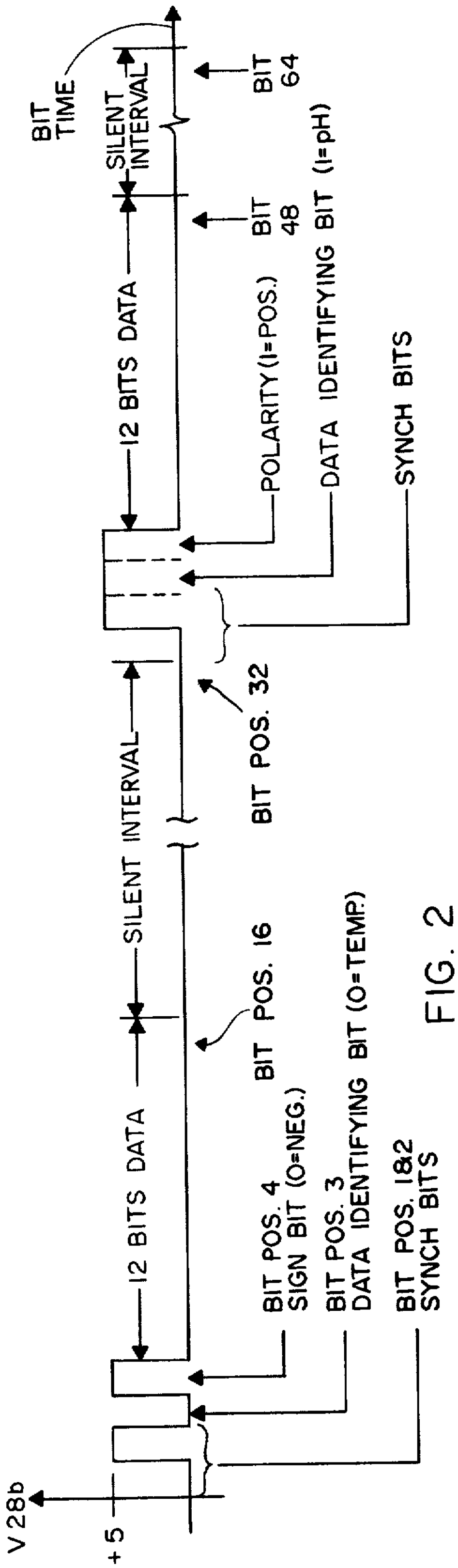
FIG. 2 illustrates one exemplary format that may be used for the transmission of information by the embodiment of FIGS. 1*a* and 1*b*, and FIGS. 3*a* and 3*b* are block diagrams of alternative circuits that may be used in the embodiment of FIGS. 1*a* and 1*b*.

Referring to FIG. 2, there is shown the voltage $V_{28b}$ at shift register output 28*b*, as a function of time, for one complete 64 bit digital signal generating cycle, i.e., for one complete digital message to be transmitted from the remote station to the central station. This 64 bit digital message is divided into four 16 bit segments which terminate at the bit times or positions marked 16, 32, 48 and 64, respectively, on the abscissa of FIG. 2. The first of these segments is a data containing segment that includes up to 12 bits of numerical data plus one polarity or sign bit, these 13 bits occupying bit positions 4–16. These last mentioned 13 bits are supplied to 13 of the 16 inputs of shift register 28 by A/D converter 26 through line 26*b*.

Also included in the first segment of the message is a single data identifying bit that occupies bit position 3. This bit is applied as an information conveying bit to one of the remaining 3 inputs of shift register 28, through line 28*f*, and is the same signal that is applied as a control signal to multiplexer 24 over line 24*d*. This dual signal application assures that no discrepancies arise between the type of data provided by multiplexer 24 and the type of data as identified by shift register 28. As shown in FIG. 2, a zero in bit position 3 indicates that the first segment contains temperature data. Thus, network 18 "packs" data identifying bits with the associated data bits to assure correct data identification.

Finally, bit positions 1 and 2 of the first message segment contain a zero and a one, respectively. These bits are introduced by connecting the two remaining inputs of shift register 28 to points that are at potentials of +5 volts and ground. When these bits occur after sixteen consecutive zeros, they unambiguously indicate to the signal receiving circuitry that a new information containing segment has begun. This allows the receiving circuitry to synchronize itself to data which follows. While the use of ones in both of bit positions 1 and 2 is possible, the use of a zero in bit position 1 is preferred since it provides for the taking up of the drift in phase position that may accumulate as a result of slight differences in the clock frequencies at the remote and central stations.

Following the temperature data contained in the first segment of the message of FIG. 2 is a silent interval or zero filled segment that occupies bit positions 17–32. While this silent interval contains no data, it is beneficial in that it provides a clear and unambiguous separation between successive data containing segments of a message, and thereby enables the signal receiving circuitry of FIG. 1*b* to distinguish the different parts of a message without having to exchange handshaking signals with the remote station. In the embodiment of FIG. 1*a*, the 16 bit silent interval is produced by an enable signal which timing and control network 30 applies to shift register 28 through line 28*d*.

Following the second, silent segment of the message of FIG. 2 is a third, data containing segment which occupies bit positions 33–48. The latter segment contains data derived from the output signal of pH sensing network 17 and has the same format as the first data containing segment, except that the data identifying bit in the third bit position of the third segment is a one rather than a zero. As shown in FIG. 2, this data identifying bit indicates that pH rather than temperature information is present. The change in the data identifying bit from a zero to a one results from a change in the state of the control signal which timing and control network 30 applies to control lines 24*d* and 28*f*. As was the case with the first data containing segment, the second data containing segment is followed by a 16 bit silent interval that occupies bit positions 49–64. It will be understood that, at the end of bit 64, the digital signal shown in FIG. 2 will have returned to its initial state and, therefore, be in condition to begin a new 64 bit message of the type shown in FIG. 2.

Assuming that it is desired that a message having the format shown in FIG. 2 be transmitted (as nearly as possible) twice per second, and that the crystal 27 that governs the frequency of the signal on conductor 26*c* has a frequency of 3.5795 mHz, the frequencies of the control signals which timing and control network 30 must apply to multiplexer 24 and shift register 28 follow by simple division. For example, the closest multiple of the crystal frequency which yields an approximately 2 Hz message repetition rate leads to the use of an approximately 1.7 Hz signal for application to multiplexer 24. From the latter frequency and the fact that there are two silent intervals per message, it follows that the control signal which is applied to shift register 28 through line 28*d* should have a frequency of approximately 3.4 Hz. In addition, the use of a 1.7 Hz message repetition rate, coupled with the fact that each message includes 64 bits, leads to the use of an approximatey 109.2 Hz shift control signal on conductor 28*e*. Finally, the duration and repetition rate of the data hold signal on line 26*e* and the shift register load signal on line 28*c* may have any convenient value, provided that the load signal is not applied to shift register 28 until the data hold signal has applied to A/D converter 26 for a sufficient time for the data on output lines 26*b* thereof to stabilize. Because the counters, gates and time delay networks necessary to produce the above signals are known to those skilled in the art, the internal structure and operation of network 30 will not be further described herein.

While data signal generating network 18 is arranged to pack two 13 bit data fields within a single 64 bit message, it will be understood that a greater or smaller number of bits or data fields may be used. If, for example, only one process variable is to be monitored, multiplexer 24 may be eliminated and the single analog signal may be applied directly to A/D converter 26. This naturally eliminates the need to apply a data identifying bit to shift register 28. Obviously, with such an arrangement, it would be possible to transmit data for the single variable twice as often as with the arrangement of FIG. 1*a*.

Conversely, if more than two process variables are to be monitored, such additional variables can be handled by packing a greater number of data fields within each message. If, for example, data for four process variables is to be transmitted over line 12, this may be accomplished by replacing 2 to 1 multiplexer 24 with a 4 to 1 multiplexer and by applying a two rather than a one bit data identifying signal to shift register 28. The resulting, longer message can then be transmitted at a lower repetition rate by using the above-described shift rate for shift register 28, or may be transmitted at the same repetition rate by doubling the shift rate of shift register 28. Still other types of digital signal generating networks may be used in practicing the present invention as will be explained more fully later in connection with FIG. 3.

To the end that the digital signal produced by signal generating network 18 may be transmitted to the central station, over power distribution line 12, without affecting the ability of the latter to supply d-c operating voltage and current to the remote station, there is provided signal transmitting network 20. As shown in FIG. 1*a*, signal transmitting network 20 includes a d-c voltage regulator 34 and a switching element which may take the form of a transistor 36 having an associated current limiting resistor 36*a* and an associated buffer amplifier 36*b*. In the preferred embodiment, regulator 34 comprises a +5 volt integrated circuit voltage regulator such as, for example, that sold under designation MC78LO5ACP by Motorola. The block 34 which depicts this voltage regulator will be understood to include the external resistors and capacitors that are recommended by the manufacturer for proper operation.

Voltage regulator 34 serves to receive the d-c voltage which power distribution line 12 applies to inputs 34*a* and 34*b* thereof, and to provide between outputs 34*c* and 34*d* thereof a regulated +5 volt d-c voltage suitable for operating the above-described circuitry of the remote station. The distribution of this voltage to all circuits of FIG. 1*a* is indicated therein by the parenthetical expression "(+5 V)" at the end of one of the power leads of each circuit network of FIG. 1*a*. It will be understood that, if any circuit network such as pH sensing network 17 requires both a positive and a negative d-c operating voltage, the negative voltage may be derived from the available positive voltage through the use of a suitable integrated circuit d-c to d-c converter, such as converter 32, which may be an integrated circuit of the type sold under the designation ICL760 by Intersil, Inc.

As is well known, one of the functions of a voltage regulator is to maintain a constant output voltage in the presence of changes in output current. Naturally, as more output current is drawn from a voltage regulator, the regulator draws more power from its energy source, resulting in an increase in the input current of the regulator. As a result, the input current of a voltage regulator may be said to vary in accordance with the output current thereof. In accordance with the present invention, this fact is taken advantage of to transmit digital information along line 12, through voltage regulator 34, with no significant effect on the magnitude of the d-c operating voltage supplied to the circuit networks of the remote station.

More particularly, switching transistor 36 is connected so that its gate electrode control circuit receives the digital signal produced by digital signal generating network 18, and so that its drain-source power circuit is connected to increase the current drawn from output 34*c* of voltage regulator 34. As a result, it will be seen that as the digital signal of FIG. 2 switches between its two states, the current drawn from voltage regulator 34 will switch between two values, the lower of which is dependent upon the total operating current drawn by the circuitry of the remote station when transistor 36 is not conducting, and the higher of which is equal to the latter current plus the current which flows through the drain-source power circuit of transistor 36 when the latter is conducting. Thus, as a result of the switching action of transmitting network 20, the current drawn from output 34*c* of voltage regulator 34 and, therefore, the current which regulator 34 draws through line 12 is made to vary in accordance with the digital signal generated by network 18. Stated differently, transmitting network 20 serves to digitally modulate the current in line 12 in accordance with the signal from signal generating network 18.

As a specific example, if CMOS integrated circuits are used within the remote station, the circuitry of FIG. 1*a* will draw a base current of approximately 18 milliamps from voltage regulator 34. Assuming further that resistor 36*a* has a value of approximately 475 ohms, the turn-on of transistor 36 will increase the current drawn from regulator 34 from the base current value of 18 milliamps to a peak current value of approximately 28 milliamps. At the relatively low frequencies described above, this percentage current change has no noticeable effect on the magnitude of the voltage supplied to the circuitry of the remote station. At input terminals 34*a* and 34*b* of regulator 34 and in line 12, however, there will occur a percentage current change which is at least as great as the output current change from 18 to 28 milliamps. While this increased line current may reduce the input voltage of regulator 34, this reduced input voltage will not affect the operating voltage at the remote station, provided that the resistance (or length) of line 12 is not excessive.

In view of the foregoing it will be seen that, without adversely effecting the d-c operating voltage at the remote station, data transmitting network 20 introduces into power distribution line 12 a digital signal current component which varies in accordance with the digital voltage signal produced by digital signal generatng network 18. As a result, the digital signal current in line 12 will be seen to include all of the information necessary to characterize the magnitude and sign of one or more analog process variables which have their effect at the remote station.

So long as the output voltage of regulator 34 remains at a constant value, the operating current which the remote station circuitry draws from regulator 34 (i.e., all current not flowing through switching transistor 36) will remain substantially constant in spite of changes in the information content of the various signals. This is particularly true with CMOS devices of the above-mentioned types since only very low level signal currents are switched. Similarly, the operating current which regulator 34 draws from line 12 to accomplish its voltage regulating function is not significantly affected by changes in the input voltage of the regulator, provided that the latter does not fall to too low a value. As a result, it will be seen that (excluding the signalling current changes produced by transistor 36) the remote station circuitry contemplated by the present invention operates on a substantially constant current basis. As will be explained later, this desirable current characteristic is responsible for the ability of the circuitry of the invention to operate, without change, with power distribution lines having a variety of lengths and resistances. Even if the remote station circuitry does not naturally exhibit a constant operating current characteristic, however, it can be made to exhibit such a characteristic by providing a suitable current regulator circuit and a bypass resistor between the utilization of circuitry and regulator 34. Naturally, if such an approach is used, switching transistor 36 must be connected so that it can draw signalling current from voltage regulator 34 without interference by the just mentioned current regulator. Ordinarily, however, the use of a remote station current regulator is unnecessary.

To the end the digital signal information carried by the signal current in power distribution line 12 may be recovered at the central station shown in FIG. 1*b*, the latter is provided with a signal receiving network 40 and a signal processing network 42. Also shown in FIG. 1*b* is the power supply 44 from which unregulated d-c power is supplied to signal receiving network 40 and line 12, through conductor pair 12'. Ordinarily, circuitry corresponding to network 40 will be provided for each remote station from which data is to be received. Signal processing network 42 and power supply 44, on the other hand, may be arranged to serve a number of different signal receiving networks.

As shown in FIG. 1*b*, power supply 44 may include a full wave rectifier 45 which is supplied with a-c power from an a-c source 46, such as the commercial a-c line, through a transformer 47. Connected across the d-c output of rectifier 45 is a suitable filter capacitor 48 for reducing the ripple content of the unregulated d-c output voltage. Because the structure and operation of power supply 44 are conventional, power supply 44 will not be further described herein.

As also shown in FIG. 1*b*, signal processing network 42 may include a microcomputer 50 having a serial input 50*a* connected to receive the digital output signal of signal receiving network 40, and having a set of output conductors 50*b* through which the output signals of the microcomputer may be outputted to an associated display or other utilization device 52. Microcomputer 50 is provided with a suitable stored program which reflects the structure of the message transmitted by the remote station, and which allows microcomputer 50 to separate the various types of data in each message on the basis of the data identifying bits associated therewith. Microcomputer 50 may also be programmed to convert received data from a serial to a parallel format. It will, therefore, be seen that signal processing circuit 42 corresponds to signal generating network 18 of FIG. 1*a*, the latter being directed to signal encoding and multiplexing and the former being directed to signal decoding and demultiplexing. Because the programming necessary to cause microcomputer 50 to accomplish the above-described objectives is conventional, it will not be further described herein.

To the end that signal receiving network 40 may detect the signal current component of the current in power distribution line 12, and produced therefrom a digital signal of the type shown in FIG. 2 for application to signal processing network 42, signal receiving network 40 includes a d-c voltage regulator 40*a* and a current detector network 40*b*. As will be described more fully presently, both of these parts of network 40 contribute to the conversion of the digital signal current in line 12 to a voltage signal suitable for application to signal processing network 42.

While both of voltage regulator networks 34 and 40*a* contribute to the operation of the present invention, the contribution of regulator 40*a* at the central station is different from that of voltage regulator 34 at the remote station. More particularly, with respect to voltage regulator 40*a*, no use is made of the fact that it can convert output current fluctuations to input current fluctuations, while maintaining a constant voltage at its output side. Instead, voltage regulator 40*a* operates in the conventional manner to effectively isolate the voltage on power distribution line 12 from the effect of variations in the output voltage of power supply 44. Thus, voltage regulator 40*a* creates, in power distribution line 12, stable current flow conditions which allow the signal current flowing in line 12 to be distinguished from the base current that flows therein to meet the power requirements of the remote station.

As shown in FIG. 1*b*, current detector network 40*b* includes a current sensing element 58 such as a resistor, and an analog comparator 60 having a reference input 60*a*, a signal input 60*b* and an output 60*c*. Associated with comparator 60 is a voltage divider including resistors 62*a* and 62*b*, the junction of which is connected to comparator reference input 60*a* and the ends of which are connected across the output of voltage regulator 40*a*. Assuming, for example, that voltage regulator 40*a* is adjusted to apply a regulated +20 volt d-c operating voltage to line 12, resistors 62*a* and 62*b* may be chosen to provide a +18.4 volt signal to comparator reference input 60*a*. The remaining signal input 60*b* of comparator 60 is connected to the remote-station side of current sensing resistor 58.

Assuming further that resistor 58 has a resistance of approximately 68.1 ohms, the voltages at comparator inputs 60*a* and 60*b* will be such that the voltage at signal input 60*b* will switch between +18.1 volts to +18.8 volts, i.e. from below to above the voltage at reference input 60*a* as the current in line 12 switches from its base current value to its signal current value during each digital signal current pulse. As a result, the voltage at comparator output 60*c* will be driven to approximately zero volts during each such pulse, causing current to flow through a current limiting resistor 64 and an optical coupling device 66 to produce an output voltage pulse at output 40*c* of signal receiving network 40. Thus, current detector network 40 will be seen to produce at output 40*c* thereof a digital signal voltage that varies in accordance with the digital current signal in power distribution line 12. Subject only to any desired processing within signal processing network 42, this digital signal voltage represents the completion of the process of communicating information from the remote station to the central station.

Even though the power distribution lines that join various remote stations to the central station may differ greatly in length, it is ordinarily not necessary to supply different lines with different regulated d-c operating voltages, provided that the output voltage of the central station voltage regulator is sufficiently high. Assume, for example, that the line voltage drop in a first relatively short line is 2 volts while the line voltage drop in a second relatively line is 10 volts. In spite of this difference, both lines will carry similar currents. This is because, as previously explained, the base operating current which the remote station circuitry draws from regulator 34 is dependent only upon the regulated output voltage of regulator 34, and because regulator 34 itself draws a constant d-c operating current from line 12. As a result, the differing voltage drops in the abovementioned first and second lines are reflected only by differing voltages across the regulators associated therewith. The latter differences in voltage have no adverse effect upon the circuitry of the invention so long as each regulator is supplied with the input voltage necessary for proper operation.

Nevertheless, where different types of remote station circuits are used, different d-c station operating currents may have to be provided. In this event, it may be desirable for the central station voltage regulator to be adjustable as necessary to provide the output voltage necessary to establish the desired line current. One adjustable voltage regulator that is suitable for use under such circumstances is that sold under the designation LM317P by National Semiconductor Corporation.

In order to assure that the output signal of signal receiving network 40 contains a minimum of environmental noise, network 40 may include suitable isolating and shielding elements. The use of optical coupling device 66 with a voltage source 68 which is electrically isolated from the remaining circuitry of FIGS. 1*a* and 1*b*, for example, assures that the signal applied to processing network 42 is unaffected by differences in ground potential between the remote and central stations. In addition, a suitable filter capacitor 69 may be connected between the reference and signal inputs of comparator 60 in order to reduce the effect of any high frequency noise signals that may be induced in line 12 as the result of its passage through a noisy industrial environment. Finally, if desired, the input conductors of comparator 60 may be provided with electromagnetic shields 70 and 72, respectively.

Figure 3A:
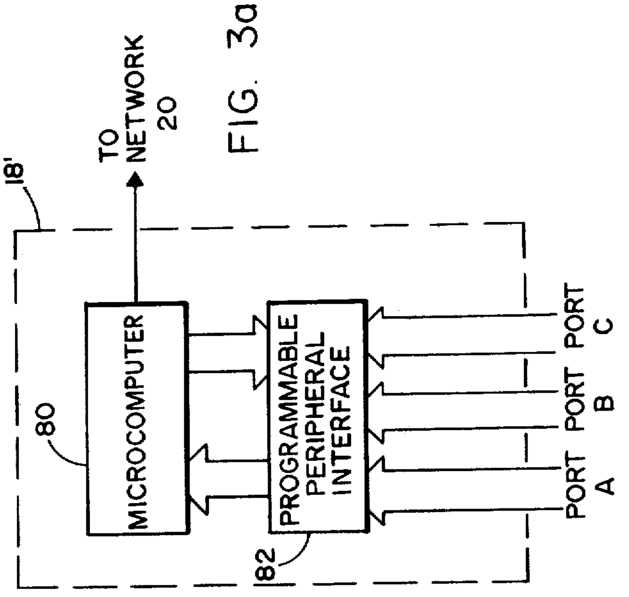

The embodiment of FIGS. 1*a* and 1*b* represents only one of a number of commercially feasible embodiments of the present invention. The remote station may, for example, be constructed with a digital signal generating network that is adapted to operate with signals that are already in digital form, such as the outputs of digital voltmeters, ammeters, and keyboards. Referring to FIG. 3*a*, for example, there is shown in simplified form an entirely digital version 18' of a digital signal generating network. As shown in FIG. 3*a*, network 18' may include a suitably programmed microcomputer chip 80, which may comprise a model 1802 manufactured by RCA, and a programmable peripheral interface chip 82, such as a model 1851, also manufactured by RCA.

As suggested by FIG. 3*a* the above-mentioned chips may be connected in a conventional, manufacturer suggested manner to enable microcomputer 80 to successively receive data in eight-bit parallel form from ports A, B and C and to supply that data in serial form to a signal transmitting network such as network 20 of FIG. 1*a*. These data transfers occur under the control of microcomputer 80 which may be programmed in a conventional manner to place the data in any desired form, such as that shown in FIG. 2. Because both the circuit connections and the programming statements necessary to produce the above-described transfers are known to those skilled in the art, these will not be described in detail herein.

Figure 3B:
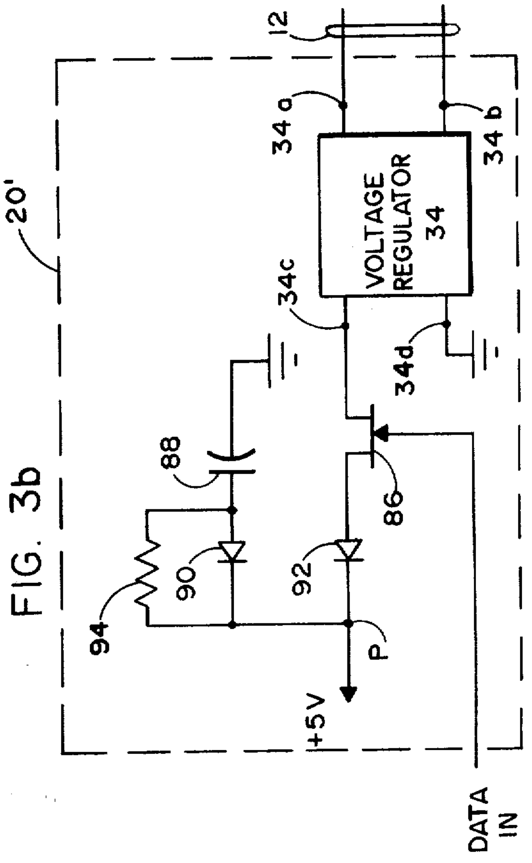

The present invention may also be practiced by utilizing a signal transmitting network which decreases rather than increases the current which is drawn from remote station voltage regulator 34. One embodiment of such an alternative signal transmitting network is network 20' of FIG. 3*b*. As shown in FIG. 3*b*, signal transmitting network 20' includes a transmitting switch which may take the form of a transistor 86 having its power circuit connected in series between output 34*c* of regulator 34 and the point P from which operating power is distributed to the remaining circuitry of the remote station. As a result, when the signal from the data signal generating network is applied to the gate of transistor 86, voltage regulator 34 will be exposed to a sequence of open circuit and full-load current conditions. These changes in current will naturally be accompanied by signal-related decreases in the current in line 12, which decreases may be detected at the central station in a manner analogous to that described in connection with current detector network 40*b*.

The alternative signal transmitting network 20' of FIG. 3*b* is not, however, the type of signal transmitting network that is contemplated for use in the preferred embodiment. This is because the turn off of series connected transistor 86 interrupts the flow of operating power to the remaining circuitry of the remote station. This problem may be corrected, however, at the cost of providing some additional circuitry, such as capacitor 88, diodes 90 and 92 and resistor 94, as will now be explained.

When transistor 86 is conducting, capacitor 88 is charged to a voltage substantially equal to the output voltage of regulator 34 by the flow of current through diode 92 and resistor 94. Later, when transistor 86 turns off, capacitor 88 discharges through diode 90 to continue to supply operating power to the circuitry of the remote station. Thus, capacitor 88 serves as a temporary source of operating power during those times when regulator 34 is disconnected by the turn off of transistor 86.

Because of the obvious advantages of the signal transmitting network of FIG. 1*b* over that of FIG. 3*b*, it is likely that the latter embodiment would never be under ordinary circumstances. Nevertheless, in the interest of illustrating that the function of the signal transmitting network is merely to introduce a predetermined discrete change in the current in power distribution line 12, the embodiment of FIG. 3*b* is included for the sake of completeness.

In view of the foregoing it will be seen that the present invention makes it possible for the power distribution line from a central station to a remote station to be utilized as a communication link therebetween. In addition, the present invention makes it possible to bring about this result in a manner which has no adverse effect on the operation of the remote station, and which lends itself to the use of both non-multiplexed and multiplexed digital signals. Finally, the present invention provides these advantages with transmitting and receiving networks that require no carrier frequency oscillators, modulators, or high, low, and/or band pass filters or coupling transformers, thereby greatly reducing the cost of providing a power line communication system for a plurality of remote stations.

What is claimed is:

1. In a communication system for communicating data from a remote station to a central station, in combination, (a) a power distribution line for supplying d-c operating power from the central station to the remote station, (b) a first voltage regulator at the central station for applying a regulated d-c voltage to the power distribution line, (c) a second voltage regulator at the remote station for providing a regulated d-c station operating voltage from the voltage and current applied thereto over the power distribution line, said second voltage regulator being of the type which draws an approximately constant d-c operating current, (d) transmitting means connected to the output of the second voltage regulator to modulate the current flowing in the power distribution line in accordance with a digital signal to be transmitted to the central station, said transmitting means having a first state in which it draws a first predetermined current from said output and a second state in which it draws approximately no current from said output, (e) signal receiving means at the central station for producing a digital signal that varies in accordance with the modulated current in the power distribution line, (f) whereby the operating voltage of the remote station remains approximately constant during the operation of the transmitting means.

2. A communication system as set forth in claim 1 in which the transmitting means comprises a two state switching element having a power circuit connected in parallel with the output of the second voltage regulator, and having a control circuit connected to receive the digital signal to be transmitted to the central station.

3. A communication system as set forth in claim 1 in which the signal receiving means includes a current sensing element connected in series with the output of the first voltage regulator, and comparing means for generating a two-state signal the state of which is dependent upon whether the current through the current sensing element is above or below a predetermined reference value.

4. A communication system as set forth in claim 3 in which:

(a) the current sensing element is a resistor, (b) the comparing means is a comparator having a reference input, and (c) said predetermined value is fixed by a voltage divider connected to the output of the first voltage regulator and to said reference input.

5. A communication system as set forth in claim 1 in which the remote station includes multiplexing means for generating a multiplexed serial format digital signal for application to the transmitting means.

6. A communication system as set forth in claim 5 in which the central station includes demultiplexing means for demultiplexing the digital signal transmitted by the transmitting means.

7. A communication system as set forth in claim 1 in which the first voltage regulator has an output voltage that may be adjusted to accommodate power distribution lines having differing resistances.

8. In a communication system for communicating information from a remote station to a central station, in combination, (a) a plurality of power distribution conductors for supplying d-c operating power from the central station to the remote station, (b) first voltage regulating means at the central station for regulating the voltage applied to the power distribution conductors, (c) second voltage regulating means at the remote station for producing a regulated d-c station operating voltage from the voltage received over the power distribution conductors, said second regulating means being of the type which draws an approximately constant d-c operating current, (d) signal transmitting means connected across the output of the second voltage regulating means for drawing a first predetermined current from said output when a digital signal is being transmitted from the remote station to the central station and for drawing a second predetermined current from said output when no digital signal is being trnsmitted from the remote station to the central station, (e) signal receiving means at the central station for sensing the flow of said first and second predetermined currents and for reconstructing said digital signal therefrom, (f) the difference between said first and second currents being sufficiently small that the operating voltage of the remote station remains approximately constant before, during and after signal transmission from the remote station.

9. A communication system as set forth in claim 8 in which the magnitude of the voltage produced by the first voltage regulating means remains approximately constant during the reception of signals from the remote station.

10. A communication system as set forth in claim 8 in which the signal transmitting means comprises a solid state switching device having a power circuit connected so that the conduction thereof increases the current drawn from the output of the second voltage regulating means and having a control circuit connected to receive a digital signal for transmission to the central station.

11. A communication system as set forth in claim 8 further including digital signal generating means for generating a digital signal for application to said signal transmitting means.

12. A communication system as set forth in claim 11 in which the digital signal generating means includes:

(a) a multiplexer for combining a plurality of analog signals into a multiplexed analog signal in which samples of each analog signal occupy respective time slots, (b) an analog-to-digital converter for generating a parallel format digital signal from said multiplexed analog signal, and (c) a shift register for generating a multiplexed serial format digital signal from the parallel format signal produced by the analog-to-digital converter.

13. A communication system as set forth in claim 11 in which the digital signal generating means comprises a microcomputer programmed to provide a multiplexed, serial format digital signal that varies in accordance with the information content of at least two signals occurring at the remote station.

14. A communication system as set forth in claim 11, 12, or 13 which utilizes a message format that includes alternating data containing and silent fields, each data containing field including at least one data identifying bit.

15. A communication system as set forth in claim 12 or 13 including signal processing means at the central station for demultiplexing the serial format digital signal produced by the signal receiving means.

16. A communication system as set forth in claim 8 in which the signal receiving means is connected between the power distribution conductors and the first voltage regulating means.

17. A communication system as set forth in claim 8 or 16 in which the signal receiving means includes:

(a) a current sensing element connected in series with a power distribution conductor to develop a signal voltage that varies with the magnitude of the current in that conductor, and (b) comparing means for providing an output signal having a first state when said signal voltage is greater than a predetermined reference voltage and a second state when said signal voltage is less than the predetermined reference voltage.

18. In a communication system for communicating information from a remote station to a central station, in combination, (a) a plurality of power distribution conductors for supplying d-c operating voltage and current from the central station to the remote station, (b) voltage regulating means at the remote station for producing a continuous regulated d-c station operating voltage from the voltage and current received over the power distribution conductors, said voltage regulating means being of the type which draws an approximately constant operating current, (c) digital signal generating means at the remote station for generating a digital signal for transmission to the remote station, said generating means being of the type that draws an approximately constant operating current, (d) switching means for switching the current in the power distribution conductors between first and second predetermined values in accordance with said digital signal, said switching means having a control circuit connected to receive said digital signal and a power circuit connected to the output of the voltage regulating means, and (e) signal receiving means at the central station for sensing the flow of said first and second currents and for reconstructing the digital signal therefrom.

* * * * *